Dec. 31, 1935.  A. VIGNE  2,026,261

JOURNAL BEARING

Filed Aug. 30, 1934

Inventor
Albert Vigne
By
Att'y

Patented Dec. 31, 1935

2,026,261

UNITED STATES PATENT OFFICE 2,026,261

JOURNAL BEARING

Albert Vigne, Webster Groves, Mo., assignor to National Bearing Metals Corporation, St. Louis, Mo., a corporation of New York Application August 30, 1934, Serial No. 742,060

5 Claims. (Cl. 308—38)

My invention relates to a journal bearing and particularly to a bearing of the split type such as is used to support a motor case upon the axle of a street railway car. Such bearings are held between the motor case or housing and a removable cap and are held against rotation with the axle by any suitable means, such as a key or dowel pin. Such means, however, does not entirely prevent relative movement between the bearing and the housing. The slight motion which always exists between the bearing and its seat results in the latter being worn out of true cylindrical form. A cylindrical bearing will, therefore, not properly fit such worn seat so as to maintain the correct distance between the gear centers and avoid play between the bearing and its seat until the seat is reshaped to true cylindrical form, an operation which is very difficult due to the location of the bearing seat.

It is the object of my invention to provide a form of bearing which may be applied to such a worn bearing seat in order to compensate for the wear. This I accomplish by providing one or both parts of the split bearing with projections of compressible material which may be deformed to a greater or less degree, as required, when the housing and the cap are drawn together to compensate for different amounts of wear at different points of the periphery of the seat.

Figure 1:
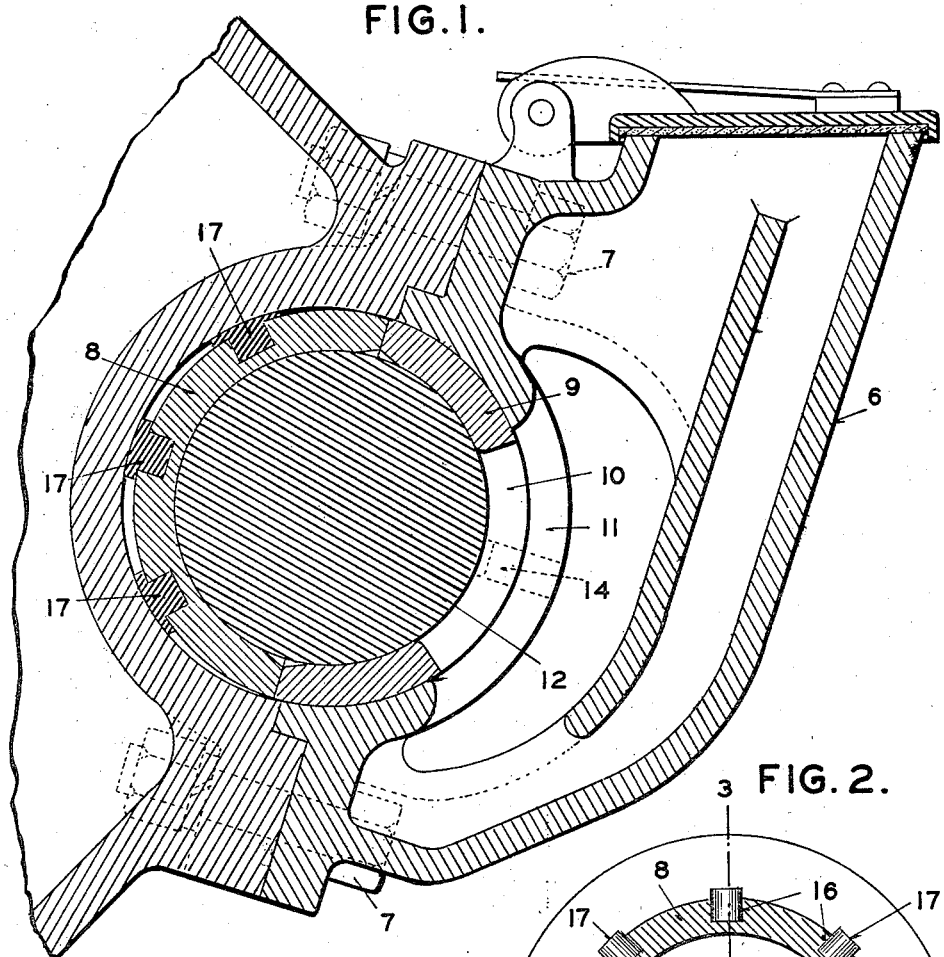
Figure 3:
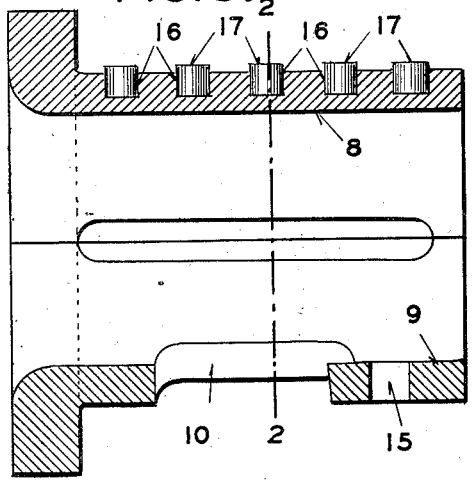
Figure 2:
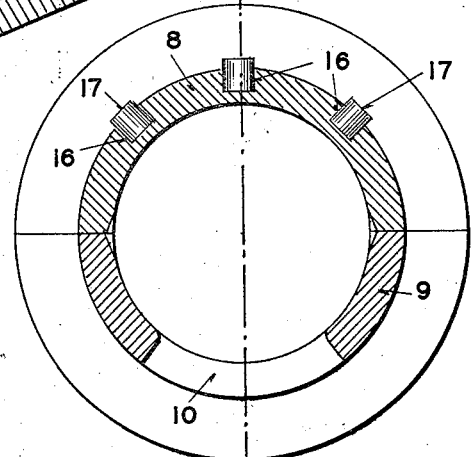

In the accompanying drawing, which illustrates one form of bearing made in accordance with my invention, Figure 1 is a vertical cross-section through a portion of a motor casing to which my bearing is applied; Figure 2 is a cross-section of the bearing alone, taken on the line 2—2 of Figure 3; and Figure 3 is a longitudinal section of the bearing taken on the line 3—3 of Figure 2.

Referring first to Figure 1, the numeral 5 indicates a portion of a motor casing in which is formed one-half of the bearing seat, the other half of said seat being formed in the cap 6. The cap 6 is secured to the casing by means of stud bolts 7 to complete the assembly. Positioned in the bearing seat between the casing and the cap is a split bearing consisting of two parts 8 and 9. the former being known as the "upper half" and the latter as the "lower half" of the bearing. Formed in the lower half of the bearing is an opening 10 registering with an opening 11 in the wall of the cap in which the lower half of the bearing seat is formed. These openings permit of oil-soaked waste or other lubricating material contained in the hollow cap contacting with the periphery of the axle 12 to lubricate the bearing. Carried in the cap wall is a dowel pin 14 engaging with a pin hole 15 (Figure 3) in the lower half of the bearing. This pin opening is preferably located, as shown, in the center of the periphery of the lower half of the bearing.

Formed in the wall of the upper half of the bearing are a number of radial holes 16 extending only partially through the wall. As shown in the drawing, these holes are arranged in three longitudinal rows, one row being positioned in the center of the periphery of the upper half of the bearing, and the other rows at equal distances at either side of the first named row. This construction results in a symmetrical distribution of the holes with respect to the parting line of the bearing and to the dowel pin 14. Positioned in each of the holes 16 is a plug 17 of hard rubber or other compressible material. These plugs project beyond the outer periphery of the bearing wall a sufficient distance to compensate for the maximum wear of the bearing seat.

In applying my bearing to a worn bearing seat the upper half of the bearing is positioned in the upper half of the bearing seat, the cap having been first removed, the axle is placed in position, the lower half of the bearing fitted to the axle, and then the cap is drawn home by means of the bolts 7. The bolts provide sufficient power to compress the plugs, distorting them to a greater or less degree, as required, to compensate for the wear of the seat, the superfluous material of the plugs being spread over on the outer face of the bearing, as shown in Figure 1. The bearing is thus caused to conform to the irregularly worn seat, compensating for such wear and providing a uniform fit for the bearing to properly align the axle.

While in the form of bearing shown, the compensating plugs are carried by the upper half of the bearing and arranged symmetrically with respect to the parting line of the bearing, it will be understood that with a different positioning of the dowel pin or other means for preventing rotation of the bearing, a different location of the plugs either in one or both halves of the bearing, may be found desirable.

Having fully described my invention, what I claim as new and desire to secure by Letters Patent of the United States is:

1. The combination with two separable members each provided with a portion of a bearing seat, of a bearing positioned in said seat, said bearing being provided with recesses in its outer periphery, fillers of compressible material in said recesses and projecting beyond the periphery of the bearing, and means for drawing said members together to cause wear compensating distortion of the fillers.

2. The combination with two separable members each provided with a portion of a bearing seat, of a bearing positioned in said seat, means for preventing rotation of the bearing in the seat, said bearing being provided with recesses in its outer periphery, said recesses being arranged symmetrically with respect to the rotation preventing means, fillers of compressible material in said recesses and projecting beyond the periphery of the bearing, and means for drawing said members together to cause wear compensating distortion of the fillers.

3. The combination with two separable members each provided with a portion of a bearing seat, of a two-part bearing, said bearing being provided with radial holes extending only partially through the wall thereof, plugs of compressible material in said holes and projecting beyond the outer periphery of the bearing wall, and means for drawing said members together to cause wear compensating distortion of the plugs.

4. The combination with two separable members each provided with a portion of a bearing seat, of a two-part bearing, said bearing being provided with radial holes extending only partially through the wall thereof, plugs of compressible material in said holes and projecting beyond the outer periphery of the bearing wall, said plugs being arranged symmetrically with respect to the parting line of the bearing, and means for drawing said members together to cause wear compensating distortion of the plugs.

5. The combination with a motor housing provided with a portion of a bearing seat, of a cooperating cap also provided with a portion of a bearing seat, a two-part bearing positioned in the seat, said cap being provided with rotation preventing means engaging one part of the bearing, the other part of the bearing being provided with radial holes extending only partially through the wall thereof, said holes being arranged symmetrically with respect to both the parting line of the bearing and the rotation preventing means, plugs of compressible material in said holes and projecting beyond the outer periphery of the bearing wall, and cap bolts for drawing said housing and cap together to cause wear compensating distortion of the plugs.

ALBERT VIGNE.